(12) United States Patent
Mori

(10) Patent No.: US 8,596,319 B2
(45) Date of Patent: Dec. 3, 2013

(54) PNEUMATIC TIRE AND METHOD OF MANUFACTURING THE SAME

(75) Inventor: Masakazu Mori, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 309 days.

(21) Appl. No.: 12/781,252

(22) Filed: May 17, 2010

(65) Prior Publication Data

US 2010/0288410 A1 Nov. 18, 2010

(30) Foreign Application Priority Data

May 18, 2009 (JP) .................................. 2009-120081

(51) Int. Cl.
*B60C 17/00* (2006.01)
*B60C 17/04* (2006.01)
*B60C 9/00* (2006.01)

(52) U.S. Cl.
USPC ........................... 152/516; 152/517; 152/526

(58) Field of Classification Search
USPC .......................................... 152/516, 517, 526
See application file for complete search history.

(56) References Cited

U.S. PATENT DOCUMENTS

| | | | |
|---|---|---|---|
| 5,711,828 A * | 1/1998 | Himuro | 152/209.25 |
| 6,453,961 B1 | 9/2002 | Colantonio et al. | |
| 6,736,176 B2 * | 5/2004 | Teratani | 152/516 |
| 7,281,553 B1 | 10/2007 | Roesgen et al. | |
| 7,537,035 B2 * | 5/2009 | Matsuda et al. | 152/531 |
| 8,251,114 B2 * | 8/2012 | Takahashi | 152/511 |

FOREIGN PATENT DOCUMENTS

| | | | |
|---|---|---|---|
| JP | 10-35232 | * | 2/1998 |
| JP | 10-035232 | | 2/1998 |
| JP | 11-180110 | * | 7/1999 |
| JP | 2002-103929 | * | 4/2002 |
| JP | 2005-219512 | | 8/2005 |
| JP | 2005-343379 | * | 12/2005 |
| JP | 2006-192962 | * | 7/2006 |
| JP | 2008-037114 | | 2/2008 |
| JP | 2008-037117 | | 2/2008 |

OTHER PUBLICATIONS

Machine translation of JP 2006-192962, 2006.*
Machine translation of JP 11-180110, 1999.*
Machine translation of JP 10-35232, 1998.*
Machine translation of JP 2005-343379, 2005.*
Machine translation of JP 2002-103929, 2002.*
The State Intellectual Property Office of the People's Republic of China; First Office Action; dated Apr. 24, 2012.

* cited by examiner

*Primary Examiner* — Justin Fischer
(74) *Attorney, Agent, or Firm* — Thorpe North & Western LLP

(57) ABSTRACT

A pneumatic tire provided with run-flat reinforcing layers 10 in left and right sidewall portions 2 that enable run-flat traveling. A tread reinforcing layer 12 formed from a thermoplastic resin or a thermoplastic elastomer composition including a blend of a thermoplastic resin component and an elastomer component is provided on an inner side of a tread portion 1.

9 Claims, 5 Drawing Sheets

PNEUMATIC TIRE AND METHOD OF MANUFACTURING THE SAME

PRIORITY CLAIM

This application is based upon and claims the benefit of priority from Japanese Patent Application No. 2009-120081, filed May 18, 2009, the entire contents of which is incorporated herein by reference.

TECHNICAL FIELD

The present invention relates to a pneumatic tire provided with run-flat functionality and a method of manufacturing the same.

BACKGROUND

Pneumatic tires with reinforcing layers having falcated cross-sections formed from a rubber having a high hardness provided on left and right side walls are known. These reinforcing layers support a load and make continued traveling possible when the pneumatic tire is in a run-flat condition due to a puncture or the like.

Pneumatic tires provided with run-flat functionality through these kinds of reinforcing layers are prone to buckling in a tread portion during run-flat traveling. Particularly, when this kind of buckling occurs on icy or snowy road surfaces, there is a problem in that a contact area with the icy or snowy road surface tire is decreased, which results in the tire slipping and traveling becoming impossible.

SUMMARY

Objects of the present invention are to provide a pneumatic tire that suppresses buckling during run-flat traveling and allows improvement in run-flat traveling performance on icy and snowy road surfaces; and to provide a method of manufacturing the same.

In order to achieve the above objects, the pneumatic tire of the present invention is a pneumatic tire that is provided with run-flat reinforcing layers in left and right sidewall portions that make possible run-flat traveling, wherein a tread reinforcing layer formed from a thermoplastic resin or a thermoplastic elastomer composition including a blend of a thermoplastic resin component and an elastomer component is provided on an inner side of a tread portion.

In the method for manufacturing a pneumatic tire of the present invention, when building a green tire provided with the tread reinforcing layer, the green tire is built by pre-forming the tread reinforcing layer by wrapping a strip material formed from the thermoplastic resin or the thermoplastic elastomer composition in a circumferential direction, and attaching the pre-formed tread reinforcing layer.

According to the aforementioned present invention, a stiffness of the tread portion can be increased and buckling during run-flat traveling can be effectively suppressed by disposing the tread reinforcing layer formed from the thermoplastic resin or the thermoplastic elastomer composition having a stiffness greater than that of rubber in the tread portion in which buckling occurs during run-flat traveling. As a result, a contact area of the tire can be maintained even on icy and snowy road surfaces and run-flat traveling can be made possible. Therefore, run-flat traveling performance on icy and snowy road surfaces can be improved.

Additionally, run-flat durability can be improved because run-flat traveling distance increases due to the suppression of buckling of the tread portion.

DETAILED DESCRIPTION

Embodiments of the present invention are described below in detail while referring to the attached drawings.

Figure 1:
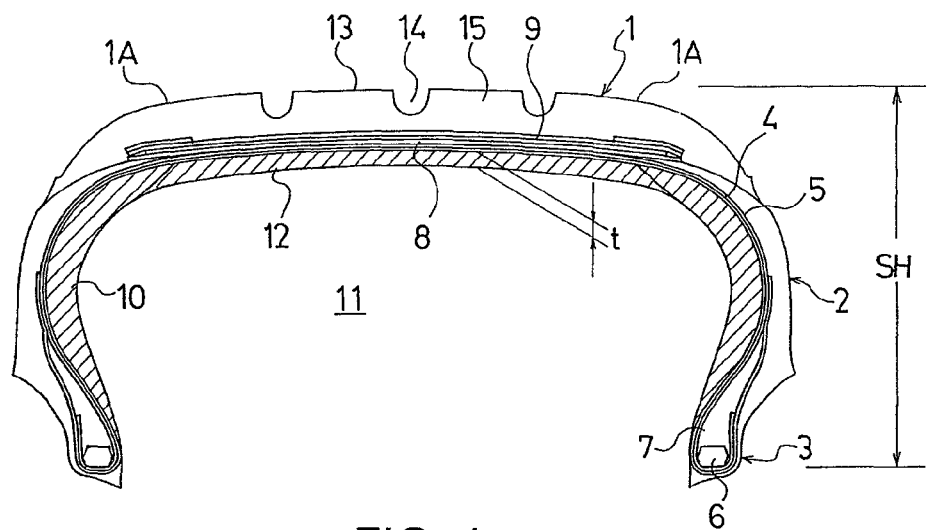
FIG. 1 is a tire meridian cross-sectional view of an embodiment of the pneumatic tire of the present invention.

FIG. 1 shows an embodiment of a pneumatic tire of the present invention, wherein 1 represents a tread portion, 2 represents a side wall portion, and 3 represents a bead portion.

Carcass layers 4, 5 extend between left and right bead portions 3, and both ends are made to sandwich a bead filler 7 around a bead core 6 that is embedded in the bead portions 3 and are folded back in the tire axial direction from the inside to the outside. A two-layer belt layer 8 is provided on an outer peripheral side of the carcass layer 5 of the tread portion 1, and a belt cover layer 9 is provided on the outer peripheral side thereof.

Left and right run-flat reinforcing layers 10 that have falcated cross-sections and that make run-flat traveling possible are provided on left and right side wall portions 2. The left and right run-flat reinforcing layers 10 are provided circularly on a tire inside surface that is on an inner side of the carcass layer 4 and faces a tire cavity portion 11. Each of the run-flat reinforcing layers 10 is formed from a thermoplastic resin or a thermoplastic elastomer composition including a blend of a thermoplastic resin component and an elastomer component.

A tread reinforcing layer 12 formed from a thermoplastic resin or a thermoplastic elastomer composition including a thermoplastic resin component and an elastomer component is provided on an inner side of the tread portion 1 so as to span between left and right shoulder portions 1A. The tread reinforcing layer 12 is also provided on the tire inside surface that is on the inner side of the carcass layer 4 and faces the tire cavity portion 11. Moreover, the tread reinforcing layer 12 is adjacent to the left and right run-flat reinforcing layers 10 and extends circularly in a tire circumferential direction. The tread reinforcing layer 12 and the left and right run-flat reinforcing layers 10 are connected in a tire width direction and cover an entirety of the tire inside surface. The tread reinforcing layer 12 and the left and right run-flat reinforcing layers 10, connected so as to form a single whole, also function as an air penetration preventing layer. Therefore, an inner liner layer, which is conventionally provided, is eliminated.

Blocks 15 are formed in a tread surface 13 by main grooves 14 that extend in the tire circumferential direction and lateral grooves (not shown) that extend in the tire width direction. Sipes (not shown) that extend in the tire width direction are provided in each of the blocks 15.

According to the present invention as described above, a stiffness of the tread portion 1 can be increased, buckling during run-flat traveling can be effectively suppressed, a contact area of the tire can be maintained even on icy and snowy road surfaces, and run-flat traveling performance on icy and snowy road surfaces can be improved due to the provision of the tread reinforcing layer 12 formed from the thermoplastic resin or the thermoplastic elastomer composition having a stiffness greater than that of rubber in the tread portion in which buckling occurs during run-flat traveling.

Additionally, run-flat traveling distance can be extended and run-flat durability can be improved because buckling of the tread portion 1 can be suppressed.

In the present invention, it is preferable that a storage elastic modulus Ea of the thermoplastic resin or the thermoplastic elastomer composition forming the tread reinforcing layer 12 fall within a range from 20 to 1,000 MPa. If the storage elastic modulus Ea is lower than 20 MPa, buckling during run-flat traveling cannot be effectively suppressed due to insufficient stiffness. On the other hand, if the storage elastic modulus Ea is higher than 1,000 MPa, the tread reinforcing layer 12 will be too hard and problems with riding comfort performance will occur. It is further preferable that the stiffness be from 20 to 500 MPa. In the present invention, "storage elastic modulus" refers to a storage elastic modulus measured by using a Toyoseiki elasticity spectrometer under the following conditions: 10% static distortion; ±2% dynamic distortion; 20 Hz frequency; and a temperature of 20° C.

It is preferable that a thickness t of the tread reinforcing layer 12 be in a range from 1 to 15 mm. If the thickness t is thinner than 1 mm, buckling during run-flat traveling will be difficult to suppress effectively due to insufficient stiffness. On the other hand, if it is thicker than 15 mm, the tread reinforcing layer 12 will be too hard, and problems with riding comfort performance will occur.

From a perspective of preventing insufficient stiffness and ensuring riding comfort performance, it is preferable that the relationship between the storage elastic modulus Ea (MPa) of the thermoplastic resin or the thermoplastic elastomer composition forming the tread reinforcing layer 12 and the thickness t (mm) of the tread reinforcing layer 12 be such that the product of (Ea×t) is in a range from 20 to 1,500 MPa/mm.

It is preferable that the storage elastic modulus of the thermoplastic resin or the thermoplastic elastomer composition forming the run-flat reinforcing layers 10 fall within a range from 20 to 500 MPa. If the storage elastic modulus is lower than 20 MPa, supporting capacity during run-flat traveling will decline and run-flat durability will decline. On the other hand, if it is higher than 500 MPa, the run-flat reinforcing layers 10 will be too hard and riding comfort performance will worsen.

Regarding a thickness of the run-flat reinforcing layers 10, it is preferable that a maximum thickness be in a range from 3 to 30 mm. If the thickness is thinner than 3 mm, supporting capacity during run-flat traveling will decline and run-flat durability will decline. On the other hand, if it is thicker than 30 mm, the run-flat reinforcing layers 10 will be too hard and riding comfort performance will worsen.

It is preferable to form the run-flat reinforcing layers 10 from the thermoplastic resin or the thermoplastic elastomer composition mentioned above, but they may also be formed from a high-hardness rubber as in the conventional art. When using a rubber, it is preferable that the thickness (maximum thickness) of the run-flat reinforcing layers 10 fall within a range from 10 to 20 mm. When forming the run-flat reinforcing layers 10 from a rubber, an inner liner layer is provided on the inner side of the carcass 4 as an air penetration preventing layer.

It is preferable that a pneumatic tire provided with the run-flat reinforcing layers 10 and tread reinforcing layer 12 as mentioned above be manufactured as follows. When building a green tire provided with the run-flat reinforcing layers 10 and the tread reinforcing layer 12, as shown in FIGS. 2 and 3, the run-flat reinforcing layers 10 and the tread reinforcing layer 12 are each pre-formed according to separate processes.

Figure 2:
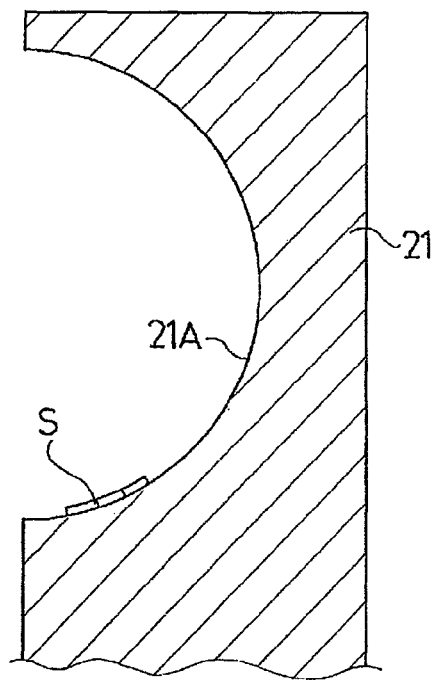
FIG. 2 is an explanatory drawing showing a process of forming the run-flat reinforcing layer.
Figure 3:
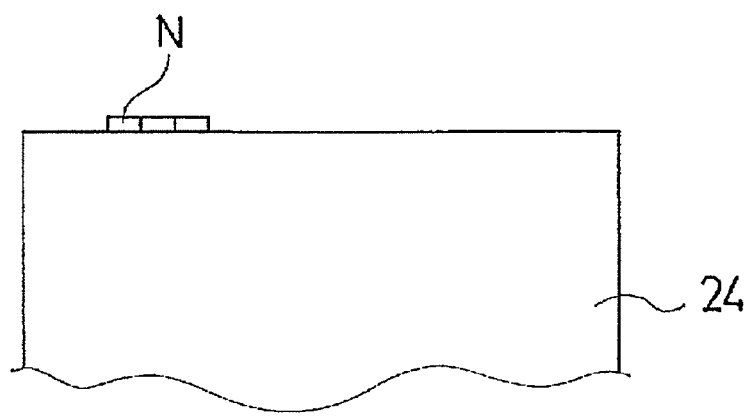
FIG. 3 is an explanatory drawing showing a process of forming the tread reinforcing layer.

FIG. 2 shows a forming process for the run-flat reinforcing layers 10, wherein the run-flat reinforcing layers 10 are formed by circularly wrapping, in advance, one or multiple strip materials S of the thermoplastic resin or the thermoplastic elastomer composition on a forming surface 21A of a forming tool 21. The strip materials S, having tension applied thereto, are sequentially wrapped around the forming tool 21 while the same is being rotated.

The run-flat reinforcing layers 10 have a construction in which the strip materials S are laminated in a tire radial direction; in the case of such a laminated construction, the strip materials S are wrapped so that tension imparted lessens the more the strip materials S are located toward an outer side in the tire radial direction (top of FIG. 2). Specifically, when wrapping the strip materials S, wrapping tension is greater the more the strip materials S are located toward an inner side in the tire radial direction, and the tension is gradually reduced so that the wrapping tension progressively decreases the more the strip materials S are located toward the outer side in the tire radial direction.

A number of wrappings increases when the run-flat reinforcing layers 10 are formed from strip materials S that use the thermoplastic resin or the thermoplastic elastomer composition. In order to stabilize a shape of such run-flat reinforcing layers 10, it is necessary to control the tension of the wrapped strip materials S; the tension is thus controlled as described above by progressively reducing the wrapping tension the more the strip materials are located toward the outer side in the tire radial direction.

From a perspective of uniformity, if the tension of the strip materials S is designated T(N), the storage elastic modulus is designated E(Pa), and the cross-sectional area is designated A ($m^2$), it is preferable that the tension from a central position of a tire cross-section height SH to the inner side in the tire radial direction be T=(0.01 to 0.15)×E×A; and the tension from the central position of the tire cross-section height SH to the outer side in the tire radial direction be T=(0.001 to 0.01)×E×A.

Figure 4:
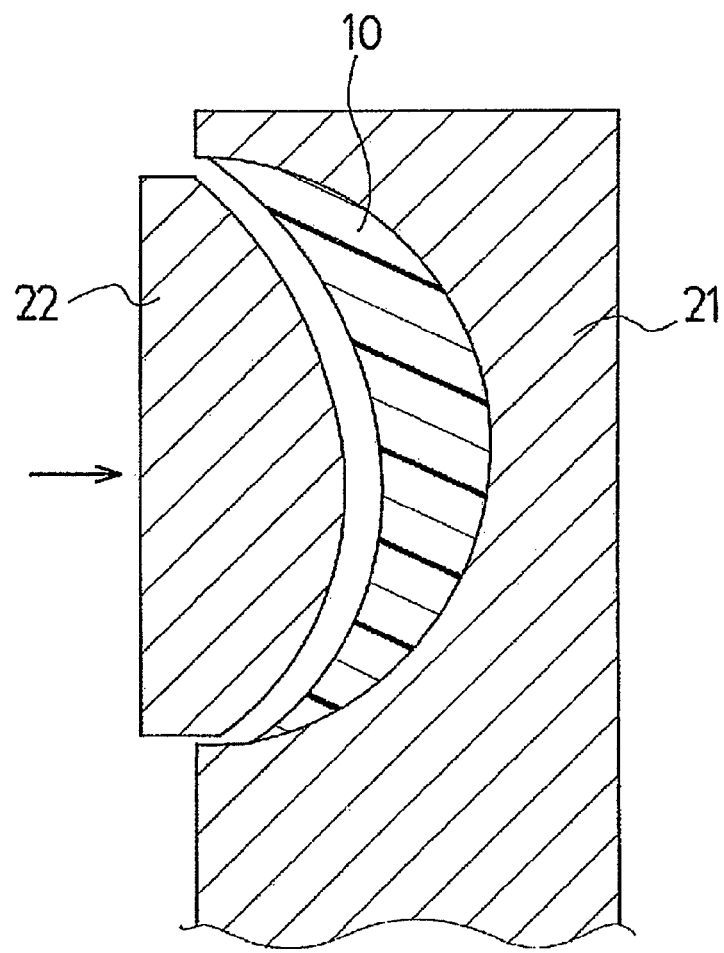
FIG. 4 is an explanatory drawing showing an example of a process of shaping the run-flat reinforcing layer.

It is preferable for the run-flat reinforcing layers 10 that the shapes of the run-flat reinforcing layers 10 be prepared by pressing a die 22 for shaping the run-flat reinforcing layers 10 as shown in FIG. 4. When the run-flat reinforcing layers 10 are formed by wrapping the strip materials S, gaps are liable to form in adjacent areas, causing air to become trapped in laminated areas, which can cause problems during a vulcanization process. By pressing with the die 22 to shape the run-flat reinforcing layers 10, the gaps are corrected and trapped air is dispersed or discharged. More preferably, it is preferable to heat the run-flat reinforcing layers 10 during shaping with the die 22 in order to further stabilize the shape. It is preferable that the die 22 be constructed so as to be able to shape the run-flat reinforcing layers 10 into a final member shape.

Figure 5:
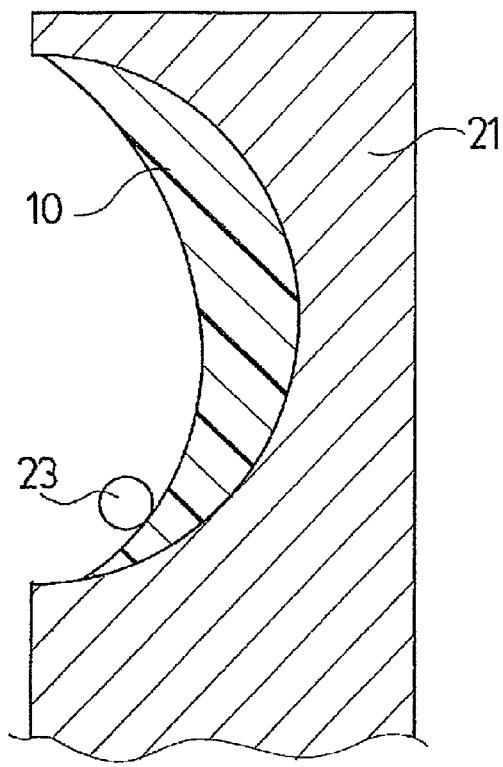
FIG. 5 is an explanatory drawing showing another example of a process of shaping the run-flat reinforcing layer.

Alternatively, as shown in FIG. 5, a freely rotating forming roller 23 may be used in place of the die 22 to shape the run-flat reinforcing layers 10 by pressing the rotatable forming roller 23 on one surface of the run-flat reinforcing layers 10 as it is rotated.

Figure 6:
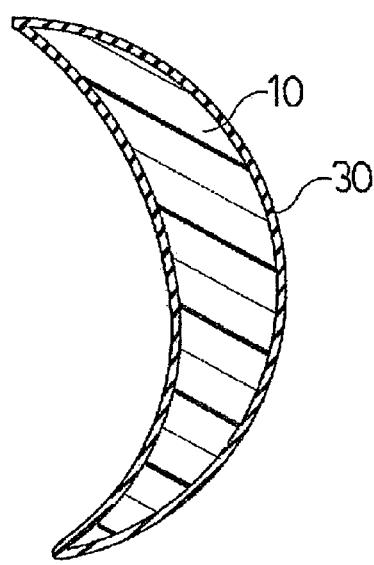
FIG. 6 is a cross-sectional view of the run-flat reinforcing layer covered by the unvulcanized rubber layer.

As shown in FIG. 6, the shaped run-flat reinforcing layers 10 are preferably covered with unvulcanized rubber layers 30. This is preferable from a perspective of adhesion with the adjacent unvulcanized carcass 4. Preferably, all of the run-flat reinforcing layers 10 are covered, but partial coverage of the areas that affect adhesion is also acceptable. It is preferable to bond the run-flat reinforcing layers 10 to the unvulcanized rubber layers 30 by using an adhesive. The unvulcanized rubber layer 30 can be of the same type of rubber as the unvulcanized carcass 4, which is a tire component adjacent thereto; or it can also be a rubber, chosen as the situation demands, having physical properties between those of the constituent material of the run-flat reinforcing layers 10 and the rubber of the carcass layer 4.

Meanwhile, FIG. 3 shows a forming process for the tread reinforcing layer 12, wherein the tread reinforcing layer 12 is formed by circularly wrapping, in advance, one or multiple strip materials N made from the thermoplastic resin or the thermoplastic elastomer composition around a drum-shaped forming tool 24. The strip materials N, having tension applied thereto, are sequentially wrapped around the forming tool 24 while the same is being rotated.

The tread reinforcing layer 12 also has a construction in which the strip materials N are laminated in the tire radial direction; in the case of such a laminated construction, it is likewise preferable that the strip materials N are wrapped so that tension imparted lessens the more the strip materials N are located toward the outer side in the tire radial direction (top of FIG. 3). That is to say, when wrapping the strip materials N, wrapping tension is greater the more the strip materials N are located toward an inner side in the tire radial direction, and the tension is gradually reduced so that the wrapping tension progressively decreases the more the strip materials N are located toward the outer side in the tire radial direction.

Figure 7:
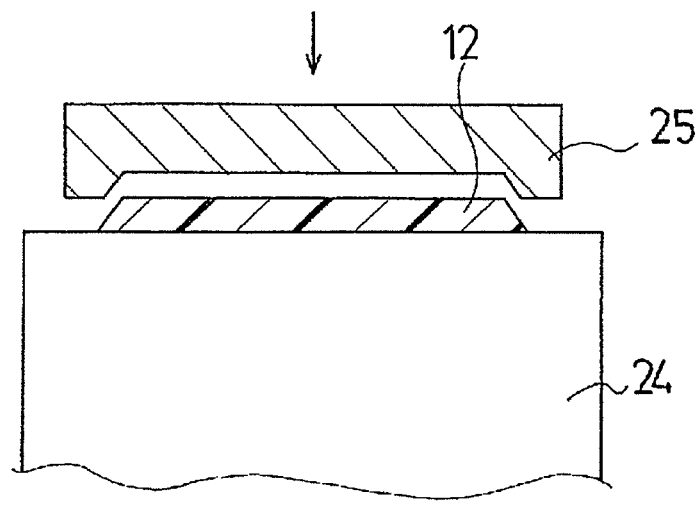
FIG. 7 is an explanatory drawing showing an example of a process of shaping the tread reinforcing layer.

For the same reason previously stated, it is preferable for the tread reinforcing layer 12 as well that the shape of the tread reinforcing layer 12 be prepared by pressing with a die 25 for shaping the tread reinforcing layer 12 as shown in FIG. 7. More preferably, it is preferable to heat the tread reinforcing layer 12 during shaping with the die 25 in order to further stabilize the shape. It is preferable that the die 25 be constructed so as to be able to shape the tread reinforcing layer 12 into a final member shape. Alternatively, as shown in FIG. 5, a freely rotating forming roller 23 may be used in place of the die 25.

Figure 8:
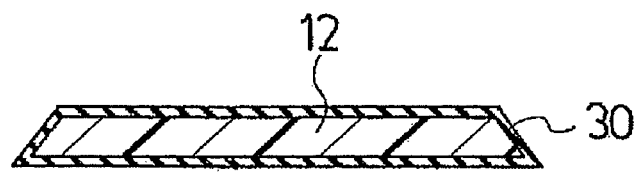
FIG. 8 is a cross-sectional view of the tread reinforcing layer covered by the unvulcanized rubber layer.

As shown in FIG. 8, the shaped tread reinforcing layer 12 is preferably covered with unvulcanized rubber layers 30. This is preferable from a perspective of adhesion with the adjacent unvulcanized carcass 4. It is preferable to bond the tread reinforcing layer 12 to the unvulcanized rubber layer 30 by using an adhesive in the same manner as described above. The unvulcanized rubber layer 30 can be of the same type of rubber as the unvulcanized carcass 4, which is a tire component adjacent thereto; or it can also be a rubber, chosen as the situation demands, having physical properties between those of the constituent material of the tread reinforcing layer 12 and the rubber of the carcass layer 4.

Figure 9:
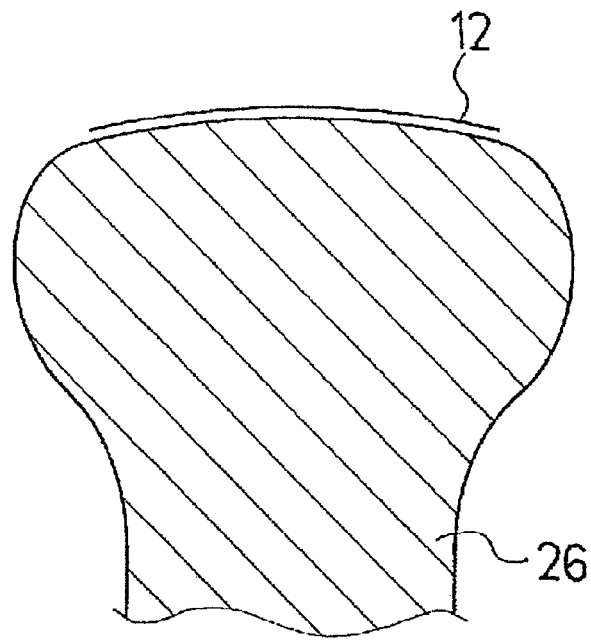
FIG. 9 is an explanatory drawing showing a process of attaching the tread reinforcing layer to the rigid core.
Figure 10:
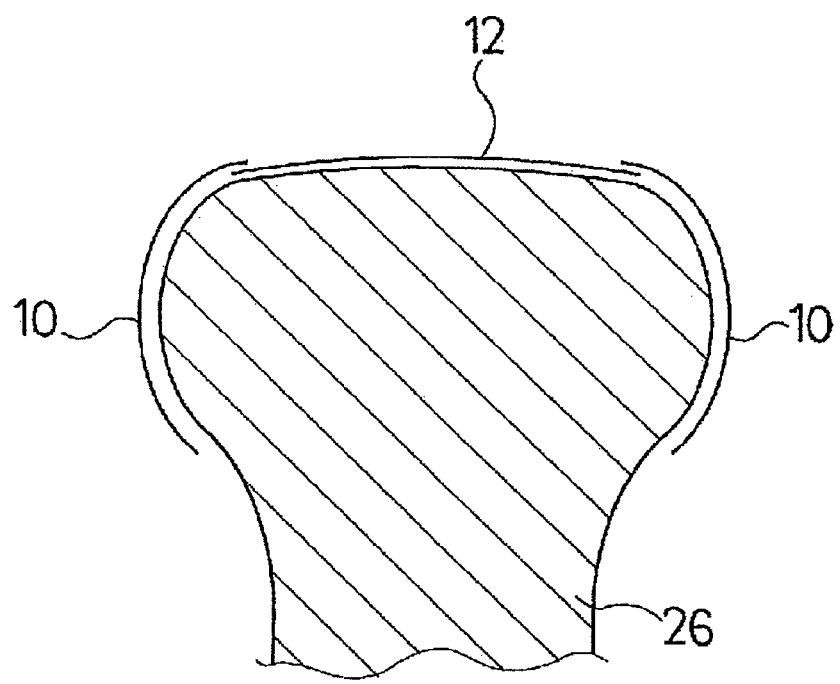
FIG. 10 is an explanatory drawing showing a process of attaching the left and right run-flat reinforcing layers to the rigid core.

A green tire is built using the run-flat reinforcing layers 10 and the tread reinforcing layer 12 that have been pre-formed in this way. Specifically, as shown in FIG. 9, the tread reinforcing layer 12 is attached on the dividable rigid core 26, which has a shape of the tire inside surface. Next, as shown in FIG. 10, the left and right run-flat reinforcing layers 10 are attached. Afterwards, each tire component is attached to build a green tire on the rigid core 26 in the same manner as in the conventional art. After building, the rigid core 26 is disassembled and the rigid core 26 is removed from the green tire. The pneumatic tire of FIG. 1 is obtained by vulcanizing the obtained green tire by means of pressure-heating in a tire vulcanization mold.

When building the green tire, by building the green tire by attaching the pre-formed tread reinforcing layer 12 and the run-flat reinforcing layers 10, the time needed to build the green tire can be shortened compared to when the green tire is built by wrapping the strip materials N and S directly onto the rigid core 26 to form the tread reinforcing layer 12 and the run-flat reinforcing layer 10, thus improving productivity.

The abovementioned strip materials N and S have quadrangular shapes such as cross-sectional rectangles or the like, but if the thermoplastic resin is used, strip materials having a width from 5 to 30 mm and a thickness from 0.1 to 0.4 mm can be preferably used. Also, when using the thermoplastic elastomer composition, strip materials having a width of 5 to 30 mm and a thickness of 1.0 to 5.0 can be preferably used. If the width and/or the thickness are less than the above ranges, a degree of freedom of the shape will decrease (it will become difficult to achieve a desired shape). On the other hand, if the above ranges are exceeded, dimensional stability will deteriorate.

In the present invention, examples of thermoplastic resins that can be used for the run-flat reinforcing layer 10 and the tread reinforcing layer 12 include polyamide resins (for instance, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer) and N-alkoxyalkylates thereof such as methoxy methylate of nylon 6, methoxy methylate of nylon 6/610 copolymer, and methoxy methylate of nylon 612; polyester resins (for instance, aromatic polyesters such as polybutylene terephthalate (PBT), polyethylene terephthalate (PET), polyethylene isophthalate (PEI), PET/PEI copolymer, polyarylate (PAR), polybutylene naphthalate (PBN), liquid crystal polyester, and polyoxyalkylene diimidic acid/polybutylene terephthalate copolymer); polynitrile resins (for instance, polyacrylonitrile (PAN), polymethacrylonitrile, acrylonitrile/styrene copolymer (AS), (meth) acrylonitrile/styrene copolymer, and (meth) acrylonitrile/styrene/butadiene copolymer); polymethacrylate resins (for instance, polymethylmethacrylate (PMMA) and polyethylmethacrylate); polyvinyl resins (for instance, vinyl acetate, polyvinylalcohol (PVA), vinyl alcohol/ethylene copolymer (EVOH), polyvinylidene chloride (PVDC), polyvinyl chloride (PVC), vinyl chloride/vinylidene chloride copolymer, vinylidene chloride/methylacrylate copolymer, and vinylidene chloride/acrylonitrile copolymer); cellulose resins (for instance, cellulose acetate and cellulose acetate butyrate); fluorine resins (for instance, polyvinylidene fluoride (PVDF), polyvinyl fluoride (PVF), polychlorofluoroethylene (PCTFE), and tetrafluoroethylene/ethylene copolymer); imide resins (for instance, aromatic polyimide (PI)); and the like.

The thermoplastic elastomer composition can be configured by mixing the elastomer component into the thermoplastic resin component described above. Examples of elastomers that may be preferably used in the present invention include diene rubbers and hydrogenates thereof (for instance, natural rubber (NR), isoprene rubber (IR), epoxidized natural rubber, styrene butadiene rubber (SBR), butadiene rubber (BR, high-cis BR and low-cis BR), nitrile butadiene rubber (NBR), hydrogenated NBR, and hydrogenated SBR); olefin rubbers (for instance, ethylene propylene rubber (EPDM, EPM), maleated ethylene propylene rubber (M-EPM), butyl rubber (IIR), isobutylene and aromatic vinyl or diene monomer copolymer, acrylic rubber (ACM), and ionomer); halogen-containing rubbers (for instance, Br-IIR, Cl-IIR, brominated copolymer of isobutylene/para-methyl styrene (Br-IPMS), chloroprene rubber (CR), chlorohydrin rubber (CHR), chlorosulfonated polyethylene rubber (CSM), chlorinated polyethylene rubber (CM), and maleated chlorinated polyethylene rubber (M-CM)); silicone rubbers (for instance, methyl vinyl silicone rubber, di-methyl silicone rubber, and methyl phenyl vinyl silicone rubber); sulfur-containing rubbers (for instance, polysulfide rubber); fluororubbers (for instance, vinylidene fluoride rubbers, fluorine-containing vinyl ether rubbers, tetrafluoroethylene-propylene rubbers, fluorine-containing silicone rubbers, and fluorine-containing phosphazene rubbers); thermoplastic elastomers (for instance, styrene elastomers, olefin elastomers, ester elastomers, urethane elastomers, and polyamide elastomers); and the like.

If compatibility varies between the above specified thermoplastic resin component and the elastomer component, a suitable compatibility accelerator can be used as a third component to bring the thermoplastic resin component and the elastomer component into compatibility. By mixing the compatibility accelerator into the blended system, interfacial tension between the thermoplastic resin and the elastomer component will decrease, with the results that a diameter of rubber particles forming a dispersed layer will become fine in size, leading to the properties of both components being displayed more effectively. Generally, the compatibility accelerator can be a copolymer having a structure of one or both of the thermoplastic resin and the elastomer component, or also a copolymer structure having an epoxy group, carbonyl group, halogen group, amino group, oxazoline group, hydroxy group, or the like that is capable of reacting with the thermoplastic resin or the elastomer component. These may be selected based on the thermoplastic resin and elastomer component that are mixed. Examples of typically used compatibility accelerators include a styrene/ethylene-butylene block copolymer (SEBS) and a maleated form thereof, EPDM, EPM, EPDM/styrene or EPDM/acrylonitrile graft copolymer and a maleated form thereof, styrene/maleic acid copolymer, reactive phenoxyne, and the like. An amount of the compatibility accelerator blended is not particularly limited, but preferably is from 0.5 to 10 parts by weight per 100 parts by weight of the polymer component (the sum of the thermoplastic resin and the elastomer component).

When blending the thermoplastic resin and the elastomer component, a composition ratio between the specific thermoplastic resin component (A) and the elastomer component (B) is not particularly limited and may be suitably determined by the storage elastic modulus and cross-sectional area of the strip materials. However, a preferable weight ratio is in the range from 90/10 to 30/70.

The thermoplastic elastomer composition according to the present invention, in addition to the aforementioned essential polymer components, may have compatibility accelerating agent polymers and other polymers mixed into it so long as the necessary properties of the thermoplastic elastomer composition for tires of the present invention are not impaired. Examples of purposes in mixing other polymers include to improve compatibility between the thermoplastic resin and elastomer component, improve shapeability of the material, improve heat resistance, reduce costs, and the like. Examples of the materials used to accomplish these purposes include polyethylene (PE), polypropylene (PP), polystyrene (PS), ABS, SBS, polycarbonate (PC), and the like. The thermoplastic elastomer composition according to the present invention may further have a filler that is generally blended with a polymer blend (for instance, calcium carbonate, titanium oxide, alumina, or the like); a reinforcing agent such carbon black, white carbon, or the like; a softener; a plasticizer; a processing aid; a pigment; a dye; an antiaging agent; or the like arbitrarily blended therein so long as the necessary properties of the storage elastic modulus are not impaired by such agents.

Additionally, the elastomer component can be dynamically vulcanized when mixed with the thermoplastic resin. When dynamically vulcanizing, vulcanizing agents, vulcanization aids, vulcanization conditions (temperature, time), and the like may be selected according the composition of the elastomer component to be added, and are not particularly limited.

Generally available rubber vulcanizers (crosslinking agents) can be used as the vulcanization agent. Specific examples of the vulcanization agent include sulfur vulcanizing agents such as powdered sulfur, precipitated sulfur, highly dispersible sulfur, surface treated sulfur, insoluble sulfur, dimorpholine disulfide, alkylphenol disulfide, and the like; which vulcanization agents can be used in an amount, for example, from about 0.5 to 4 phr ("phr" refers to parts by weight per 100 parts by weight of the rubber component (elastomer)).

Additionally, examples of organic peroxide-based vulcanizing agents include benzoyl peroxide, t-butyl hydroperoxide, 2,4-dichlorobenzoyl peroxide, 2,5-dimethyl-2,5-di(t-butylperoxy)hexane, 2,5-dimethylhexane-2,5-di(peroxyl benzoate), and the like; which vulcanization agents can be used in an amount, for example, from about 1 to 20 phr.

Furthermore, examples of phenol resin-based vulcanizing agents include brominated alkylphenol resins and mixed crosslinked systems containing an alkyl phenol resin and a halogen donor such as tin chloride, chloroprene, or the like; which vulcanization agents can be used in an amount, for example, from about 1 to 20 phr. Other examples of vulcanizing agents include zinc white (about 5 phr), magnesium oxide (about 4 phr), litharge (about 10 to 20 phr), p-quinone dioxime, p-dibenzoylquinone dioxime, tetrachloro-p-benzoquinone, poly-p-dinitrosobenzene (about 2 to 10 phr), and methylenedianiline (about 0.2 to 10 phr).

As necessary, a vulcanization accelerator may be added. For the vulcanization accelerator, generally available vulcanization accelerators such as aldehyde-ammonia-based, guanidine-based, thiazole-based, sulfenamide-based, thiuram-based, dithioic acid salt-based, and thiourea-based vulcanization accelerators can be used in an amount of, for example, from about 0.5 to 2 phr. Specific examples include an aldehyde ammonia vulcanization accelerator such as hexamethylene tetramine and the like; a guanidine vulcanization accelerator such as diphenyl guanidine and the like; a thiazole vulcanization accelerator such as dibenzothiazyl disulfide (DM), 2-mercaptobenzothiazole and its Zn salt; a cyclohexylamine salt, and the like; a sulfenamide vulcanization accelerator such as cyclohexyl benzothiazyl sulfenamide (CBS), N-oxydiethylene benzothiazyl-2-sulfenamide, N-t-butyl-2-benzothiazole sulfenamide, 2-(thymol polynyl dithio)benzothizole, and the like; a thiuram vulcanization accelerator such as tetramethylthiuram disulfide (TMTD), tetraethylthiuram disulfide, tetramethylthiuram monosulfide (TMTM), dipentamethylenethiuram tetrasulfide, and the like; a dithionate vulcanization accelerator such as Zn-dimethyl dithiocarbamate, Zn-diethyl dithiocarbamate, Zn-n-butyl dithiocarbamate, Zn-ethylphenyl dithiocarbamate, Te-diethyl dithiocarbamate, Cu-dimethyl dithiocarbamate, Fe-dimethyl dithiocarbamate, pipecoline pipecolyl dithiocarbamate, and the like; and a thiourea vulcanization accelerator such as ethylene thiourea, diethyl thiourea, and the like may be mentioned.

Additionally, a generally-used aid for a rubber can be used in conjunction as a vulcanization accelerator aid. For example, zinc white (about 5 phr), stearic acid, oleic acid and their Zn salts (about 2 to 4 phr), or the like can be used. The method for producing the thermoplastic elastomer composition is as follows. The thermoplastic resin component and the elastomer component (which is unvulcanized in the case of rubber) are melt-kneaded in advance using a bi-axial kneader/extruder or the like. The elastomer component is dispersed as a dispersed phase (domain) in the thermoplastic resin that forms a continuous phase (matrix). When vulcanizing the elastomer component, the vulcanizing agent may be added while kneading so as to dynamically vulcanize the elastomer component. Although various compounding agents (except for vulcanizing agents) may be added to the thermoplastic resin or the elastomer component during the kneading, it is preferable to premix the compounding agents before the kneading. A kneader used for kneading the thermoplastic resin and the elastomer component, is not particularly limited and a screw extruder, kneader, Banbury Mixer, bi-axial kneader/extruder, or the like can be used. Among these, the bi-axial kneader/extruder is preferably used for kneading the thermoplastic resin and the elastomer component and for dynamically vulcanizing the elastomer component. Furthermore, two or more types of kneaders can be used to successively knead the thermoplastic resin and the elastomer component. As a condition for the melt kneading, it is preferable that a temperature should equal to or higher than a melting temperature of the thermoplastic resin. A shear rate at the time of kneading is preferably 1,000 to 7,500 $sec^{-1}$. An overall kneading time is from 30 seconds to 10 minutes. Additionally, in the case of adding a vulcanizing agent, a vulcanization time after addition is preferably from 15 seconds to 5 minutes. The thermoplastic elastomer composition produced by the above method may be formed into a desired strip shape by a generally-used method for forming a thermoplastic resin such as injection molding, extrusion molding, or the like.

The strip material thus obtained has a structure in which the elastomer component (B) is dispersed as a discontinuous phase in a matrix of the thermoplastic resin (A). By adopting such a structure, it is possible to provide both sufficient flexibility and sufficient stiffness due to an effect of the resin layer being the continuous phase. Furthermore, when molding, it is possible to obtain a molding processability equivalent to that of the thermoplastic resin regardless of the amount of the elastomer component.

The run-flat reinforcing layers 10 and the tread reinforcing layer 12 may be adhered to the carcass layer 4 that is adjacent to the run-flat reinforcing layer 10 and the tread reinforcing layer 12 using the following process. An adhesive including a conventional rubber-based, phenolic resin-based, acryl copolymer-based, isocyanate-based, or a like polymer and a crosslinking agent that have been dissolved in a solvent is coated on the bead filler, and adhering is performed through the heat and pressure at the time of vulcanization molding. Additionally, another process for adhering is as follows. An adhesive-use resin such as styrene-butadiene-styrene copolymer (SBS), ethylene-ethyl-acrylate (EEA), styrene-ethylene-butylene block copolymer (SEBS), or the like is extruded together with the strip material or is laminated so as to form a multi-layer laminate, which is adhered to the adjacent carcass layer 4 at the time of vulcanization. Examples of solvent based adhesives include phenolic resin-based (CHEMLOK 220, Lord Corporation), chlorinated rubber-based (CHEMLOK 205, CHEMLOK 234B), isocyanate-based, (CHEMLOK 402), and the like.

In the abovementioned embodiment, the pneumatic tire according to the present invention has the run-flat reinforcing layers 10 provided facing the tire cavity portion 11. However, the run-flat reinforcing layers 10 may be between the two-layer carcass layer 4, 5. Additionally, when an inner liner is provided, the run-flat reinforcing layers 10 may be provided between the inner liner and an inner side of the carcass layer 4.

The present invention can be preferably used in a pneumatic tire for use on icy and snowy road surfaces having run-flat functionality that is provided with sipes in the blocks, but is not, of course, limited to such use.

EXAMPLES

A common tire size of 205×55R15 was used. A present invention tire 1 (example 1) having a structure as shown in FIG. 1 in which run-flat reinforcing layers having falcated cross-sections and being formed from a rubber were provided on an inner side of left and right sidewall portions and a tread reinforcing layer formed from a thermoplastic elastomer composition shown in Table 1 (having a storage elastic modulus of 60 MPa) was provided on an inner side of a tread portion; a present invention tire 2 (example 2) having a structure as shown in FIG. 1 in which run-flat reinforcing layers having falcated cross-sections and being formed from a thermoplastic resin shown in Table 2 (having a storage elastic modulus of 60 MPa) were provided on an inner side of left and right sidewall portions and a tread reinforcing layer formed from the same thermoplastic resin was provided on an inner side of a tread portion; a conventional tire that is the same as invention tire 1 except that the tread reinforcing layer was not provided (conventional example); and a comparative tire that is the same as invention tire 1 except that the tread reinforcing layer was formed from a rubber having a Japanese Industrial Standard (JIS) hardness of 70 (comparative example) were respectively built as test tires.

The tread reinforcing layer of each invention tire and comparative tire has a common thickness of 5 mm. Additionally, a maximum thickness of the run-flat reinforcing layers is 10 mm for the invention tire 2 and 15 mm for the invention tire 1, the conventional tire, and the comparative tire.

Each of these test tires was mounted on a rim having a rim size of 16×6J. Air pressure was adjusted to be 0 kPa, and each tire was used for a rear left wheel of a passenger vehicle (loaded with a load equivalent to four passengers) having an engine displacement of 2,000 cc. Evaluation testing of run-flat driving performance on ice, run-flat braking performance on ice, and run-flat durability were performed according to the following testing methods and the results shown in Table 3 were obtained. Note that the same size tires and rims as mentioned above were used for the wheels other than the rear left wheel as well. Air pressure of these tires was adjusted to be 230 kPa.

Run-Flat Driving Performance on Ice

Run-flat driving performance on ice was evaluated on the following 3-step scale on an icy road test course having an ice temperature of −2° C., O: Drove without slipping Δ: Drove with slipping x: Spun out and was not able to drive at all Run-Flat Braking Performance on Ice Distance required to come to a stop was measured after applying the brakes fully while traveling at a speed of 40 km/hr on an icy road test course having an ice temperature of −2° C. The evaluation results are expressed as an index value with a conventional tire being 100. A larger index value indicates superior run-flat braking performance on ice.

Run-Flat Durability

Running distance was measured on an oblong circuit dry road test course. Driving speed was 80 km/hr. A distance until a test driver felt abnormal vibrations caused by failure of the test tire and stopped traveling was measured. The evaluation results are expressed as an index value with a conventional tire being 100. A larger index value indicates superior run-flat durability.

TABLE 1

| | Material composition | Product name | Manufacturer |
|---|---|---|---|
| Thermoplastic resin | Nylon 11 (50%) | RILSAN BESNO TL | ARKEMA |
| Elastomer | Modified BPR (50%) | TAFMER MP0610 | Mitsui Chemicals, Inc. |

TABLE 2

| | Material composition | Product name | Manufacturer |
|---|---|---|---|
| Thermoplastic resin | Nylon 11 (50%) | RILSAN BESNO TL | ARKEMA |

TABLE 3

| | Conventional example | Comparative example | Example 1 | Example 2 |
|---|---|---|---|---|
| Run-flat driving performance on ice | X | Δ | ○ | ○ |
| Run-flat braking performance on ice | 100 | 102 | 105 | 120 |
| Run-flat durability | 100 | 100 | 102 | 115 |

From Table 3, it is clear that the present invention tire makes possible improvement in run-flat breaking and driving performance on ice, thereby making possible improvement in run-flat traveling performance on icy and snowy road surfaces. It is also clear that the invention tire makes possible improvement in run-flat durability.

What is claimed is:

1. A pneumatic tire provided with run-flat reinforcing layers in left and right sidewall portions that enable run-flat traveling, wherein
a tread reinforcing layer formed from a thermoplastic elastomer composition comprising a blend of a thermoplastic resin component and an elastomer component is provided on an inner side of a tread portion, a storage elastic modulus of the thermoplastic elastomer composition forming the tread reinforcing layers being from 20 to 1,000 MPa,
ends in the tire width direction of the tread reinforcing layer are connected with the run-flat reinforcing layers in the left and right sidewall portions respectively, and a tire inner surface formed by the tread reinforcing layer and the run-flat reinforcing layers is convex toward an outside in the tire radial direction when viewed from a tire meridional cross-sectional view,
the run-flat reinforcing layers in the left and right sidewall portions and the tread reinforcing layer are different elements from one another, and
a stiffness of the tread reinforcing layer is greater than a stiffness of a rubber in the tread portion.

2. The pneumatic tire according to claim 1, wherein a thickness of the tread reinforcing layer is from 1 to 15 mm.

3. The pneumatic tire according to claim 1, wherein a product of the storage elastic modulus of the thermoplastic elastomer composition forming the tread reinforcing layer and the thickness of the tread reinforcing layer is from 20 to 1,500 MPa/mm.

4. The pneumatic tire according to claim 1, wherein the run-flat reinforcing layers are formed from the thermoplastic elastomer composition comprising a blend of the thermoplastic resin component and the elastomer component.

5. The pneumatic tire according to claim 4, wherein the tread reinforcing layer and the run-flat reinforcing layers are provided on a tire inside surface that faces a tire cavity portion, and the tread reinforcing layer and run-flat reinforcing layers are connected so as to cover the tire inside surface.

6. The pneumatic tire according to claim 1, wherein blocks formed on a tread surface are provided with sipes.

7. The pneumatic tire according to claim 1, wherein a thickness of the run-flat reinforcing layers is from 2 to 3 times a thickness of the tread reinforcing layer, and wherein an elastic modulus of the runflat reinforcing layers is from 20 to 500 MPa.

8. The pneumatic tire according to claim 1, wherein the run-flat reinforcing layers comprise strip materials formed from the thermoplastic elastomer composition and wrapped in a circumferential direction, and wherein a wrapping tension of the strip materials is progressively reduced toward an outer side in the tire radial direction.

9. The pneumatic tire according to claim 8, wherein the wrapping tension T of the strip materials from a central position of a tire cross-section height to the inner side in the tire radial direction is $T=(0.01 \text{ to } 0.15) \times E \times A$, where E is a storage elastic modulus of the thermoplastic elastomer composition forming the tread reinforcing layers and A is a cross-sectional area of the tread reinforcing layers; and the wrapping tension from the central position of the tire cross-section height to the outer side in the tire radial direction is $T=(0.001 \text{ to } 0.01) \times E \times A$.

* * * * *